(12) United States Patent
Maeda

(10) Patent No.: US 10,795,038 B2
(45) Date of Patent: Oct. 6, 2020

(54) INFORMATION PRESENTATION SYSTEM, MOVING VEHICLE, INFORMATION PRESENTATION METHOD, AND NON-TRANSITORY STORAGE MEDIUM

(71) Applicant: PANASONIC INTELLECTUAL PROPERTY MANAGEMENT CO., LTD., Osaka (JP)

(72) Inventor: Kazuhiko Maeda, Osaka (JP)

(73) Assignee: PANASONIC INTELLECTUAL PROPERTY MANAGEMENT CO., LTD., Osaka (JP)

( * ) Notice: Subject to any disclaimer, the term of this patent is extended or adjusted under 35 U.S.C. 154(b) by 0 days.

(21) Appl. No.: 16/557,053

(22) Filed: Aug. 30, 2019

(65) Prior Publication Data

US 2020/0003917 A1   Jan. 2, 2020

Related U.S. Application Data

(63) Continuation of application No. PCT/JP2018/040718, filed on Nov. 1, 2018.

(30) Foreign Application Priority Data

Nov. 7, 2017   (JP) ................................. 2017-215121

(51) Int. Cl.
  *G08B 23/00* (2006.01)
  *G01V 1/00* (2006.01)
  (Continued)

(52) U.S. Cl.
  CPC .............. *G01V 1/001* (2013.01); *G01S 15/86* (2020.01); *G01S 15/89* (2013.01); *G01S 15/93* (2013.01); *G06K 9/00805* (2013.01)

(58) Field of Classification Search
  CPC ................................. G01V 1/001; G01S 15/86
  (Continued)

(56) References Cited

U.S. PATENT DOCUMENTS

2003/0113096 A1*  6/2003  Taira ................... H04N 9/8042
                                                                 386/230
2012/0161951 A1   6/2012  Ito et al.
(Continued)

FOREIGN PATENT DOCUMENTS

JP       63-001232      1/1988
JP       08-278160     10/1996
                (Continued)

OTHER PUBLICATIONS

Official Communication issued in International Patent Application No. PCT/JP2018/040718, dated Dec. 18, 2018, along with an English translation thereof.

(Continued)

*Primary Examiner* — Tai T Nguyen
(74) *Attorney, Agent, or Firm* — Greenblum & Bernstein, P.L.C.

(57) ABSTRACT

An information presentation system according to the present disclosure makes a presentation unit present each of multiple different pieces of information such that an image displayed in a first form and a sound output in a second form are synchronized with each other on an individual basis. The information presentation system also makes the presentation unit shift, when presenting two different pieces of information, selected from the multiple different pieces of information, as two sounds in the second form, a timing to output one of the two sounds by at least a certain period of time with respect to a timing to output the other of the two sounds, in order to prevent the two sounds from overlapping with each other.

20 Claims, 9 Drawing Sheets

(51) Int. Cl.
   *G01S 15/86* (2020.01)
   *G01S 15/89* (2006.01)
   *G01S 15/93* (2020.01)
   *G06K 9/00* (2006.01)

(58) Field of Classification Search
   USPC .......... 367/93; 340/517, 521, 635–638, 540, 340/541
   See application file for complete search history.

(56) References Cited

U.S. PATENT DOCUMENTS

| | | |
|---|---|---|
| 2016/0210097 A1* | 7/2016 | Forutanpour ......... G06F 3/1423 |
| 2017/0047064 A1 | 2/2017 | Kirihara |
| 2017/0153644 A1 | 6/2017 | Otsuka et al. |

FOREIGN PATENT DOCUMENTS

| | | |
|---|---|---|
| JP | 2007-122536 | 5/2007 |
| JP | 2009-129052 | 6/2009 |
| JP | 2012-068818 | 4/2012 |
| JP | 2012-133686 | 7/2012 |
| JP | 2016-038689 | 3/2016 |
| WO | 2015/186445 | 12/2015 |

OTHER PUBLICATIONS

Japanese Office Action dated May 19, 2020 issued in Japanese patent application No. 2017-215121 and corresponding English translation.

* cited by examiner

INFORMATION PRESENTATION SYSTEM, MOVING VEHICLE, INFORMATION PRESENTATION METHOD, AND NON-TRANSITORY STORAGE MEDIUM

CROSS-REFERENCE TO RELATED APPLICATIONS

This application is a U.S. continuation of International Patent Application No. PCT/JP2018/040718, filed on Nov. 1, 2018, which in turn claims the benefit of priority to Japanese Patent Application No. 2017-215121, filed on Nov. 7, 2017. Both of these patent applications are assigned to the assignee of the present application.

TECHNICAL FIELD

The present invention generally relates to an information presentation system, a moving vehicle, an information presentation method, and a non-transitory storage medium, and more particularly relates to an information presentation system, a moving vehicle, an information presentation method, and a non-transitory storage medium, all of which are configured or designed to present multiple different pieces of information.

BACKGROUND ART

Japanese Unexamined Utility Model Publication S63-1232 discloses a display device including a display unit with the ability to present the amount of time that has elapsed since the device started to be used. The display device changes, when the amount of time elapsed, displayed on the display unit, reaches a preset amount of time, the color of the letters indicating amount of time elapsed into a different color, makes the set of the letters blinking, and sounds an alarm discontinuously in synch with the blink of the letters.

A display device (information presentation system) such as the one described in Japanese Unexamined Utility Model Publication S63-1232 is increasingly required to present multiple different pieces of information in a distinguishable way.

SUMMARY

The present disclosure provides an information presentation system, a moving vehicle, an information presentation method, and a non-transitory storage medium, all of which are configured or designed to present multiple different pieces of information in a distinguishable way.

An information presentation system according to an aspect of the present disclosure makes a presentation unit, having the ability to present multiple different pieces of information, change, with passage of time, a first form of presentation of an image displayed and a second form of presentation of a sound output with respect to each of the multiple different pieces of information. The information presentation system makes the presentation unit present each of the multiple different pieces of information such that the image displayed in the first form and the sound output in the second form are synchronized with each other on an individual basis. The information presentation system makes the presentation unit shift, when presenting two different pieces of information, selected from the multiple different pieces of information, as two sounds in the second form, a timing to output one of the two sounds by at least a certain period of time with respect to a timing to output the other of the two sounds, in order to prevent the two sounds from overlapping with each other.

A moving vehicle according to another aspect of the present disclosure includes: the information presentation system described above; and a moving vehicle body equipped with the presentation unit.

An information presentation method according to still another aspect of the present disclosure includes making a presentation unit with the ability to present multiple different pieces of information change, with passage of time, a first form of presentation of an image displayed and a second form of presentation of a sound output with respect to each of the multiple different pieces of information. The information presentation method includes making the presentation unit present each of the multiple different pieces of information such that the image displayed in the first form and the sound output in the second form are synchronized with each other on an individual basis. The information presentation method further includes shifting, when presenting two different pieces of information, selected from the multiple different pieces of information, as two sounds in the second form, a timing to output one of the two sounds by at least a certain period of time with respect to a timing to output the other of the two sounds, in order to prevent the two sounds from overlapping with each other.

A non-transitory storage medium according to still another aspect of the present disclosure stores a program designed to make a computer system perform processing of making a presentation unit with the ability to present multiple different pieces of information change, with passage of time, a first form of presentation of an image displayed and a second form of presentation of a sound output with respect to each of the multiple different pieces of information. The processing includes making the presentation unit present each of the multiple different pieces of information such that the image displayed in the first form and the sound output in the second form are synchronized with each other on an individual basis. The processing further includes shifting, when presenting two different pieces of information, selected from the multiple different pieces of information, as two sounds in the second form, a timing to output one of the two sounds by at least a certain period of time with respect to a timing to output the other of the two sounds, in order to prevent the two sounds from overlapping with each other.

BRIEF DESCRIPTION OF DRAWINGS

The figures depict one or more implementations in accordance with the present teachings, by way of example only, not by way of limitations. In the figures, like reference numerals refer to the same or similar elements.

DESCRIPTION OF EMBODIMENTS

First Embodiment (1) Overview

An overview of an information presentation system 1 according to a first exemplary embodiment will be described with reference to FIGS. 1 and 2.

An information presentation system 1 according to the first embodiment may be provided for a moving vehicle 10, for example, and is designed to present information to the user 200 of the moving vehicle 10 traveling. In this embodiment, the moving vehicle 10 may be a car (hereinafter referred to as a "car 10"), for example, and the user 200 may be a driver who is driving the car 10. As used herein, examples of pieces of information include various pieces of driver assistance information about vehicle velocity, navigation, pedestrians in front of the car, cars in front of the car, deviation from the lane, and condition of the car. In this embodiment, the information may be information about pedestrians in front of the car, for example.

Figure 2:
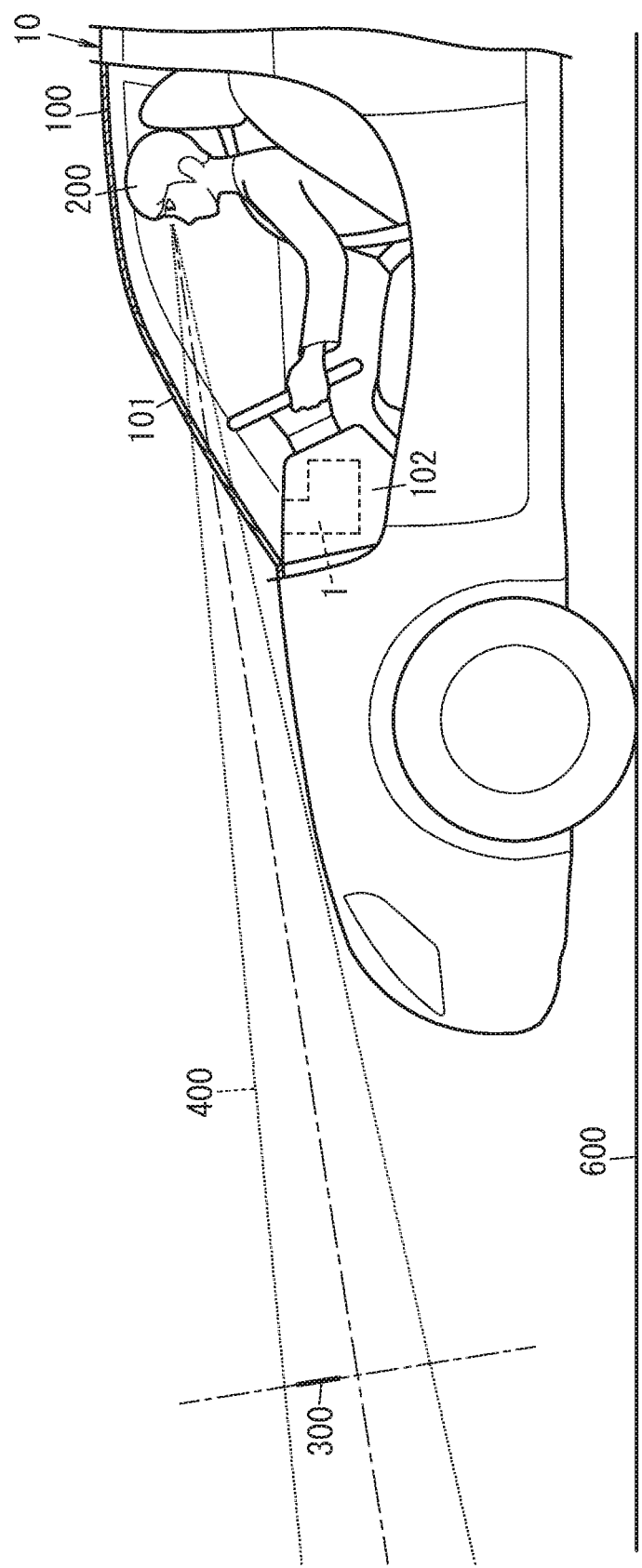
FIG. 2 is a schematic representation of a moving vehicle including the information presentation system.

The information presentation system 1 according to this embodiment may be implemented as a head-up display (HUD) system for use in cars 10 as shown in FIG. 2. The information presentation system 1 is installed in the vehicle cabin of the moving vehicle 10 so as to project an image toward the windshield 101 of the moving vehicle 10 from below the windshield 101. In the example illustrated in FIG. 2, the information presentation system 1 is arranged in a dashboard 102 below the windshield 101. When an image is projected from the information presentation system 1 toward the windshield 101, the image reflected from the windshield 101 is viewed by the user 200.

This information presentation system 1 allows the user 200 to view a virtual image 300 projected toward the space in front of the car 10 (outside of the car 10) as an image superimposed on the real space in front of the car 10. As used herein, the "virtual image" refers to an image formed by a ray of the light emitted from the information presentation system 1 and diverging from the windshield 101 and other parts of the car 10 as if there actually was an object in the space. Also, the virtual image 300 is projected onto a position corresponding to an object to be detected 700, which is present in an object space 400, according to the distance from the car 10 to the object to be detected 700 (see FIG. 3).

Also, the information presentation system 1 according to this embodiment is configured to output a first sound S11 and a second sound S12 (see FIGS. 4A and 4B) according to the distances from the car 10 to the objects to be detected 701 and 702 (see FIG. 3) present in the object space 400. The first sound S11 is associated with a virtual image 301 of the object to be detected 701, while the second sound S12 is associated with a virtual image 302 of the object to be detected 702. That is to say, while the virtual image 301 is being displayed in the object space 400, the first sound S11 is output according to the distance from the car 10 to the object to be detected 701. On the other hand, while the virtual image 302 is being displayed in the object space 400, the second sound S12 is output according to the distance from the car 10 to the object to be detected 702.

The display device disclosed in Japanese Unexamined Utility Model Publication S63-1232 changes, when the amount of time elapsed since the device started to be used reaches a preset amount of time, the color of letters indicating the amount of time elapsed into a different color, makes the set of the letters blinking, and sounds an alarm discontinuously in synch with the blink of the letters. This informs the user that the amount of time elapsed has reached the preset amount of time. The display device disclosed in Japanese Unexamined Utility Model Publication S63-1232, however, is able to present only one piece of information (i.e., the amount of time elapsed) at a time. Thus, there is a growing demand for a display device (information presentation system) with the ability to present multiple different pieces of information in a distinguishable way.

To present multiple different pieces of information in a distinguishable way, the information presentation system 1 according to this embodiment has the following configuration:

An information presentation system 1 according to this embodiment includes a presentation unit 11 with the ability to present multiple different pieces of information. The presentation unit 11 is configured to change, with passage of time, a first form of presentation of an image displayed and a second form of presentation of a sound output with respect to each of the multiple different pieces of information. The information presentation system 1 makes the presentation unit 11 present each of the multiple different pieces of information such that the image displayed in the first form (virtual image 301, 302) and the sound in the second form (first sound S11 and second sound S12) are synchronized with each other on an individual basis. The information presentation system 1 also makes the presentation unit 11 shift, when presenting two different pieces of information, selected from the multiple different pieces of information, as two sounds (first sound S11 and second sound S12) in the second form, a timing to output one of the two sounds S10 by at least a certain period of time T2 with respect to a timing to output the other of the two sounds, in order to prevent the two sounds (first sound S11 and second sound S12) from overlapping with each other.

A moving vehicle 10 according to this embodiment includes the information presentation system 1 and a moving vehicle body 100 equipped with the presentation unit 11.

As can be seen, while the presentation unit 11 is made to present multiple different pieces of information, the timings to output a plurality of sounds (the first sound S11 and the second sound S12), associated one to one with the multiple different pieces of information, are shifted by at least a certain period of time T2 to prevent the plurality of sounds from overlapping with each other. This allows the user 200 to distinguish the plurality of sounds from each other and identify multiple different pieces of information associated one to one with the plurality of sounds. In other words, when making the presentation unit 11 present multiple different pieces of information, the information presentation system 1 is able to present the multiple different pieces of information to the user 200 in a distinguishable way.

(2) Details

Next, the information presentation system 1 according to this embodiment will be described in further detail with reference to FIGS. 1-3.

(2.1) Information Presentation System

Figure 1:
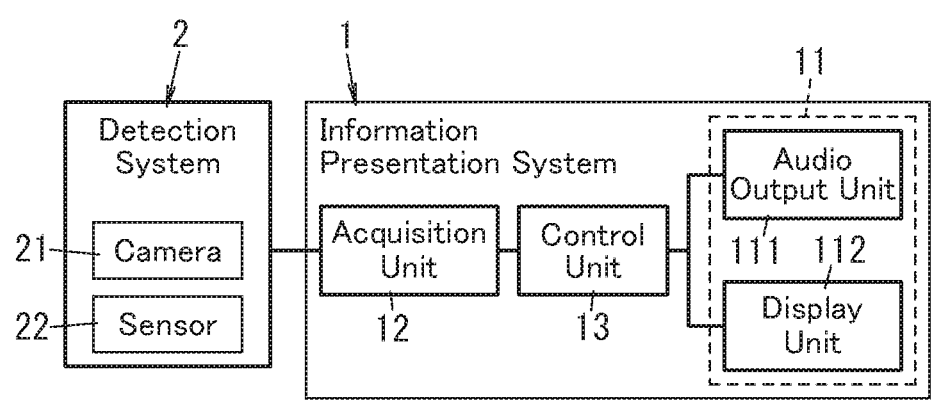
FIG. 1 is a block diagram of an information presentation system according to a first embodiment.

An information presentation system 1 includes a presentation unit 11, an acquisition unit 12, and a control unit 13 as shown in FIG. 1. The presentation unit 11 includes an audio output unit 111 and a display unit 112. In other words, the presentation unit 11 includes a single display unit 112 and does include an audio output unit 111 as well. The display unit 112 presents an image displayed in the first form, while the audio output unit 111 presents a sound in the second form.

In the following description, the plurality of virtual images 301, 302 will be hereinafter collectively referred to as "virtual images 300", if there is no need to distinguish the virtual images 301, 302 from each other. In addition, in the following description, the first sound S11 and the second sound S12 will be hereinafter collectively referred to as "sounds S10", if there is no need to distinguish the first sound S11 and the second sound S12 from each other. Furthermore, in the following description, the plurality of objects to be detected 701, 702 will be hereinafter collectively referred to as "objects to be detected 700", if there is no need to distinguish the objects to be detected 701, 702 from each other.

In this embodiment, the audio output unit 111 is made up of two loudspeakers 111A and 111B. As shown in FIG. 3, the loudspeaker 111A is arranged on the front left side for the user 200 seated in the driver's seat, while the loudspeaker 111B is arranged on the front right side for the user 200. In this embodiment, the loudspeaker 111A is associated with the virtual image 301 of the object to be detected 701 located on the left side of the object space 400, and the loudspeaker 111B is associated with the virtual image 302 of the object to be detected 702 located on the right side of the object space 400. That is to say, the loudspeaker 111A outputs the first sound S11 in accordance with the distance from the car 10 to the object to be detected 701, while the loudspeaker 111B outputs the second sound S12 in accordance with the distance from the car 10 to the object to be detected 702. The audio output unit 111 makes the loudspeakers 111A and 111B output the first sound S11 and the second sound S12, respectively, in accordance with a first control signal supplied from the control unit 13.

In this embodiment, the display unit 112 is made up of a screen, an irradiator, and a projection optical system. The screen has transparency and forms virtual images 300 (see FIG. 3) on the windshield 101. That is to say, an image is rendered on the screen based on the light emitted from the irradiator, and the virtual images 300 are produced on the windshield 101 based on the light transmitted through the screen. The screen is arranged between the irradiator and the projection optical system. The irradiator may be a scanning light irradiator and irradiates the screen with light. The light source of the irradiator may be a laser module for emitting a laser beam. The light that has been radiated from the irradiator and then transmitted through the screen is incident on the projection optical system, which projects the virtual images 300 onto the windshield 101 based on the incident light. The display unit 112 displays (i.e., projects) the virtual images 300 on the windshield 101 in accordance with a second control signal supplied from the control unit 13.

The acquisition unit 12 acquires information detected about the objects to be detected 700, which are present in the object space 400, from a detection system 2 (to be described later). The acquisition unit 12 also acquires information about the location of the car 10 (hereinafter referred to as "location information") and information about the condition of the car 10 (hereinafter referred to as "vehicle information") from the detection system 2. As used herein, the "objects to be detected 700" are object present in the object space 400 which need to attract the user's 200 attention, such as objects against which the car 10 could possibly collide. In this embodiment, the objects to be detected 700 are supposed to be humans present in the object space 400. However, this is only an example and should not be construed as limiting. The objects to be detected 700 do not have to be humans but may also be any other type of mobile bodies including animals, bicycles, cars, motorcycles, wheelchairs, and strollers.

The control unit 13 is implemented as a microcomputer including a processor and a memory. That is to say, the control unit 13 is configured as a computer system including a processor and a memory. The computer system is allowed to function as the control unit 13 by having the processor execute an appropriate program. The program may be stored in advance in the memory, downloaded via a telecommunications line such as the Internet, or distributed after having been stored in a non-transitory storage medium such as a memory card.

The control unit 13 makes the presentation unit 11 present an image displayed in the first form and a sound in the second form. The control unit 13 controls the audio output unit 111 with a first control signal and also controls the display unit 112 with a second control signal.

The control unit 13 has the virtual images 300, corresponding to the objects to be detected 700 present in the object space 400, displayed on the display unit 112 (i.e., projected onto the object space 400) in accordance with the information detected by the detection system 2. Specifically, in the example illustrated in FIG. 3, the objects to be detected 701, 702 who are pedestrians are present in the object space 400, and therefore, the control unit 13 has the virtual images 301, 302 corresponding to the objects to be detected 701, 702 displayed on the display unit 112. In other words, the presentation unit 11 has a plurality of images (e.g., the virtual images 301, 302), associated one to one with the multiple different pieces of information, displayed in the first form on the display unit 112. In the example illustrated in FIG. 3, the virtual images 301, 302 are horizontally elongated markers to be projected onto the windshield 101 so as to be visible in front of the objects to be detected 701, 702, respectively. The control unit 13 has the virtual images 301, 302, corresponding to the objects to be detected 701, 702, respectively, displayed on the display unit 112 at visual ranges corresponding to the respective distances from the car 10 to the objects to be detected 701, 702. Note that the virtual images 301, 302 do not have to be elongated markers but may also be changed into any other appropriate form such as frame virtual images surrounding the objected to be detected 701, 702.

Also, the control unit 13 has the first sound S11 and the second sound S12 output by the audio output unit 111 in accordance with the distances from the car 10 to the objects to be detected 701, 702. Specifically, the control unit 13 makes the audio output unit 111 output the first sound S11 in association with the virtual image 301 of the object to be detected 701 and also makes the audio output unit 111 output the second sound S12 in association with the virtual image 302 of the object to be detected 702. In this embodiment, the control unit 13 makes the audio output unit 111 output the first and second sounds S11, S12 as discontinuous sounds, as an example. The control unit 13 also controls the audio output unit 111 such that the shorter the distance from the car 10 to the object to be detected 701, 702 is, the shorter the interval of output of the first or second sound S11, S12 becomes. That is to say, the control unit 13 changes the second form of presentation of a sound with the passage of time for each of the multiple different pieces of information.

In this case, the control unit 13 suitably makes the virtual images 301, 302 blinking with the discontinuous first and second sounds S11 and S12, respectively, to allow the user 200 recognize the association between the virtual images 301, 302 and the first and second sounds S11, S12. In other words, for each of the multiple different pieces of information, the first form of presentation of images (e.g., the virtual images 301, 302) and the second form of presentation of sounds (e.g., the first and second sounds S11, S12) are suitably synchronized with each other on an individual basis. As used herein, when two forms of presentation are "synchronized with each other." the duration of the virtual image 301 (or virtual image 302) blinking may naturally perfectly agree with the duration of the first sound S11 (or the second sound S12) being output, but these two durations may overlap with each other at least partially. Furthermore, the control unit 13 suitably controls the intervals of blinking of the virtual images 301, 302 such that the shorter the distance from the car 10 to the object to be detected 701, 702 is, the shorter not only the interval of output of the first or second sound S11, S12 but also the interval of blinking of the virtual image 301, 302 become. That is to say, the control unit 13 suitably changes, with the passage of time, the first form of presentation of an image for each of the multiple different pieces of information.

Suppose the first sound S11 and the second sound S12 are alternately output from the audio output unit 111. If the interval between the timing to output the first sound S11 and the timing to output the second sound S12 were too short, then the user 200 could be unable to distinguish the first and second sounds S11 and S12 from each other. The auditory ability of humans requires an interval of about 200 milliseconds [ms] to allow a human to distinguish a plurality of sounds from each other. That is why if the interval between the timing to output the first sound S11 and the timing to output the second sound S12 is shorter than 200 ms, then the user 200 cannot distinguish the first and second sounds S11 and S12 from each other. Thus, the information presentation system 1 according to this embodiment is configured as follows to allow the user 200 to distinguish a plurality of sounds from each other.

Figure 4A:
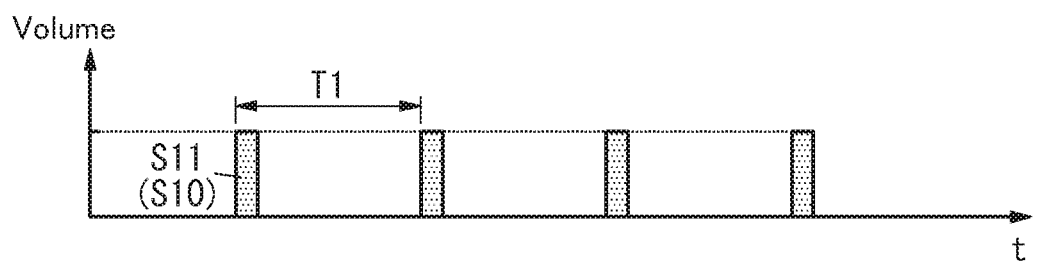
FIGS. 4A and 4B are timing diagrams illustrating how the information presentation system operates.
Figure 4B:
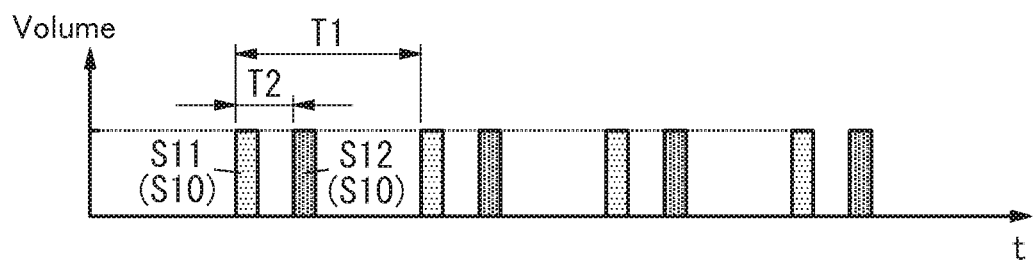

FIGS. 4A and 4B are timing diagrams indicating the timings for the information presentation system 1 according to this embodiment to output the first and second sounds S11 and S12. FIG. 4A is a timing diagram showing a situation where the audio output unit 111 is made to output only the first sound S11. FIG. 4B is a timing diagram showing a situation where the audio output unit 111 is made to output both the first sound S11 and the second sound S12. In FIGS. 4A and 4B, the abscissa indicates the time and the ordinate indicates the volume.

In FIG. 4A, the control unit 13 makes the audio output unit 111 output the first sound S11 every preset period of time T1 (of, e.g., one second). On the other hand, in FIG. 4B, the control unit 13 makes the audio output unit 111 output the second sound S12 every time a certain period of time T2 (hereinafter referred to as a "time delay T2") passes since the output of the first sound S11. In this example, the certain period of time T2 is set at 200 ms to allow the user 200 to distinguish the first and second sounds S11 and S12 from each other. As can be seen, shifting, by the certain period of time T2 (of e.g., 200 ms), the timing to output the second sound S12 with respect to the timing to output the first sound S11 allows the user 200 to distinguish the first and second sounds S11 and S12. In other words, this allows the information presentation system 1 to make the presentation unit 11 present the first and second sounds S11 and S12 such that the user 200 can distinguish the objects to be detected 701, 702 (pieces of information) associated with the first and second sounds S11 and S12 from each other. Note that the interval between the respective timings to output the first and second sounds S11 and S12 needs to be at least as long as the certain period of time T2, and specifically, may be at least equal to 200 ms.

(2.2) Detection System

The detection system 2 may include a camera 21 and a sensor 22, as shown in FIG. 1, for example.

The camera 21 includes an image capture device such as a charge-coupled device (CCD) image sensor or a complementary metal oxide semiconductor (CMOS) image sensor, and captures an image of the object space 400.

The sensor 22 may be implemented as a light detection and ranging (LIDAR) sensor, for example. The sensor 22 irradiates the object space 400 with a pulsed laser beam, and receives the light reflected from an object present in the object space 400. The sensor 22 estimates the distance to the object based on the length of the interval between the emission of the laser beam and the reception of the reflected light.

The detection system 2 recognizes the object to be detected 700, present in the object space 400, based on an image captured by the camera 21 and in accordance with a learning model generated by a machine learning algorithm, for example. Also, based on the result of detection by the sensor 22, the detection system 2 obtains, as pieces of detection information, the distance from the car 10 to the object to be detected 700, the relative coordinates of the object to be detected 700 with respect to the car 10, the relative velocity of the car 10 with respect to the object to be detected 700, and attributes of the object to be detected 700. As used herein, the "attributes of the object to be detected 700" are pieces of information indicating the type of the object to be detected 700. The detection system 2 may recognize the type of a given object to be detected 700 as any one of mobile bodies including humans, animals, bicycles, cars, motorcycles, wheelchairs, and strollers, fixed objects including traffic light apparatuses, street lamp poles, and power poles, and movable objects such as droppings.

Furthermore, the detection system 2 may detect the current location of the car 10 using a global positioning system (GPS), for example, and obtain location information about the location of the car 10 based on the current location of the car 10. The detection system 2 acquires map information about an area surrounding the current location based on the current location of the car 10. The detection system 2 may either retrieve the map information about the area surrounding the current location from a memory that stores the map information or acquire the map information from an external server of a mobile communications device that the detection system 2 or the car 10 includes by communicating with the external server. As used herein, the location information may be information about the road (traffic route) at the current location of the car 10, for example. Examples of the location information include the number of lanes of the road, the width of the road, the presence or absence of any sidewalk, the angle of slope, the curvature of a curve, whether or not the current location is an intersection (between crossroads or at a T-junction), and whether or not the road is a one-way road.

Optionally, the detection system 2 may also acquire vehicle information about the condition of the car 10 from an advanced driver assistance system (ADAS). The vehicle information is information about a local condition of the car 10 itself and may be detected by a sensor mounted on the car 10. Specific examples of the vehicle information include the moving speed (traveling velocity) of the car 10, the acceleration on the car 10, the angle of the gas pedal (i.e., the accelerator position), the angle of the brake pedal, the steering angle, and the driver's pulsation, expression and line of sight detected by a driver monitor. The vehicle information may also include data specific to the car 10 such as the width, height, and total length of the car and the eye point thereof.

In the embodiment described above, the detection system 2 includes the camera 21 and the sensor 22. However, this is only an example and should not be construed as limiting. Rather, the detection system 2 does not have to include both of the camera 21 and the sensor 22 as long as the detection system 2 is able to detect the object to be detected 700. For example, the detection system 2 may include at least one of the camera 21, the sensor 22, a sonar, or a radar. Alternatively, the sensor included in the detection system 2 may be used in combination with the ADAS system.

(3) Operation

Figure 5:
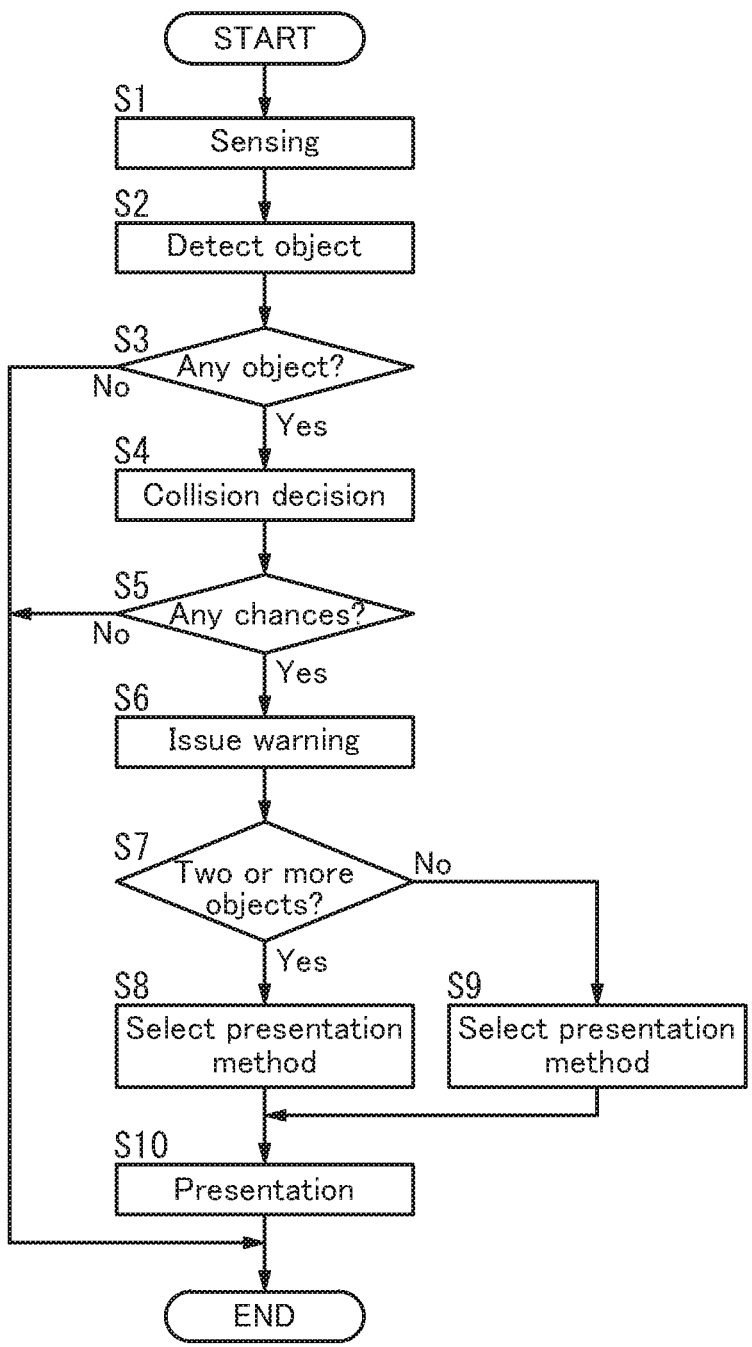
FIG. 5 is a flowchart illustrating how the information presentation system operates.

Next, it will be described with reference to FIG. 5 how the information presentation system 1 according to this embodiment performs the presentation operation.

First of all, when the user 200 who is the driver of the car 10 turns an ignition switch ON, the information presentation system 1 and the detection system 2 are powered and start to operate. The detection system 2 senses the object space 400 using the camera 21 and the sensor 22 (in Step S1) and performs processing of determining, based on the result of measurement of the camera 21 and the sensor 22, whether or not there any object to be detected 700 (i.e., the target) in the object space 400 (in Step S2).

If there is any object to be detected 700 in the object space 400 (i.e., if the answer is YES in Step S3), then the control unit 13 of the information presentation system 1 determines whether or not there are any chances of the object to be detected 700 colliding against the car 10 (in Step S4). In this processing step, the control unit 13 makes the collision decision based on the distance from the car 10 to the object to be detected 700, which the acquisition unit 12 has acquired from the detection system 2.

If there are any chances of the object to be detected 700 colliding against the car 10 (i.e., if the answer is YES in Step S5), then the control unit 13 makes the presentation unit 11 issue a warning to the user 200 (in Step S6). The control unit 13 next determines, in Step S7, whether or not there are two or more objects to be detected (or targets) 700 and selects an appropriate method of presentation for the presentation unit 11 depending on the answer to the question of S7.

If there is only one object to be detected 700 (i.e., if the answer is NO in Step S7), then the control unit 13 makes the presentation unit 11 carry out the first and second forms of presentation with respect to the single object to be detected 700 (in Steps S9 and S10). For example, if only a single object 701 has been detected, then the control unit 13 instructs the display unit 112 to blink the virtual image 301 and also instructs the audio output unit 111 to output the first sound S11 discontinuously in synch with the blink of the virtual image 301 (see FIG. 4A).

On the other hand, if there are two or more objects to be detected 700 (i.e., if the answer is YES in Step S7), then the control unit 13 makes the presentation unit 11 carry out the first and second forms of presentation with respect to each of the two or more objects to be detected 700 (in Steps S8 and S10). For example, if two objects 701, 702 have been detected, then the control unit 13 makes the presentation unit 11 carry out the first and second forms of presentation with respect to each of the two objects to be detected 701, 702. In this case, as for the first object to be detected 701, the control unit 13 allows the virtual image 301 to blink and has the first sound S11 output discontinuously in synch with the blink of the virtual image 301 as in Steps S9 and S10 described above (see FIG. 4A). As for the second object to be detected 702, on the other hand, the control unit 13 has the second sound S12 output when the certain period of time T2 passes since the output of the first sound S11 to allow the user 200 to distinguish the first and second sounds S11 and S12 from each other (see FIG. 4B). At this time, the control unit 13 allows the virtual image 302 to blink when the certain period of time T2 passes since the virtual image 301 is allowed to blink, in order to synchronize the virtual image 302 with the second sound S12.

Note that if no objects to be detected (targets) 700 have been detected in Step S3 or if there are no (or slim) chances of the object to be detected 700 colliding against the car 10 in Step S5, then the information presentation system 1 ends the presentation operation. The information presentation system 1 and the detection system 2 perform this series of processing steps S1 to S10 at regular intervals.

(4) Variations

Note that the first exemplary embodiment is just one of various embodiments of the present disclosure. Rather, the first exemplary embodiment may be readily modified, replaced, or combined with any other embodiment, depending on the design or any other factor, without departing from a true spirit and scope of the present disclosure. Also, functions similar to the ones performed by this information presentation system 1 may be implemented as an information presentation method, a (computer) program, or a non-transitory computer-readable storage medium on which the program is stored.

An information presentation method according to an aspect includes making a presentation unit 11 with the ability to present multiple different pieces of information change, with passage of time, a first form of presentation of an image displayed and a second form of presentation of a sound output with respect to each of the multiple different pieces of information. The information presentation method includes: making the presentation unit 11 present each of the multiple different pieces of information such that the image (virtual image 301, 302) in the first form and the sound S11, S12 in the second form are synchronized with each other on an individual basis. The information presentation method further includes shifting, when having two different pieces of information, selected from the multiple different pieces of information, presented by the presentation unit 11 as two sounds S11, S12 in the second form, a timing to output one of the two sounds S11, S12 by at least a certain period of time T2 with respect to a timing to output the other of the two sounds S11, S12, in order to prevent the two sounds S11, S12 from overlapping with each other.

A non-transitory storage medium according to another aspect stores a program that is designed to make a computer system perform processing of making a presentation unit 11 with the ability to present multiple different pieces of information change, with passage of time, a first form of presentation of an image displayed and a second form of presentation of a sound output with respect to each of the multiple different pieces of information. The processing includes: making the presentation unit 11 present each of the multiple different pieces of information such that the image (virtual image 301, 302) in the first form and the sound S11, S12 in the second form are synchronized with each other on an individual basis. The processing further includes shifting, when having two different pieces of information, selected from the multiple different pieces of information, presented by the presentation unit 11 as two sounds S11, S12 in the second form, a timing to output one of the two sounds S11, S12 by at least a certain period of time T2 with respect to a timing to output the other of the two sounds S11, S12, in order to prevent the two sounds S11, S12 from overlapping with each other.

Variations of the first embodiment will be described one after another. Note that the variations to be described below may be combined with each other as appropriate.

(4.1) First Variation

In the first exemplary embodiment described above, the certain period of time T2 is supposed to have a fixed value. However, this is only an example and should not be construed as limiting. Alternatively, the certain period of time T2 does not have to have a fixed value but may also have a value proportional to the (physical) distance between the objects to be detected 700. As used herein, the "distance" refers to the shortest distance between the objects to be detected 700 in a three-dimensional space. A first variation of the information presentation system 1 will be described with reference to FIG. 6. Note that the information presentation system 1 and the detection system 2 may have the same configuration as their counterparts of the first embodiment. Thus, in the following description, any constituent member of this variation having the same function as a counterpart of the first embodiment described above will be designated by the same reference numeral as that counterpart's, and a detailed description thereof will be omitted herein.

Figure 3:
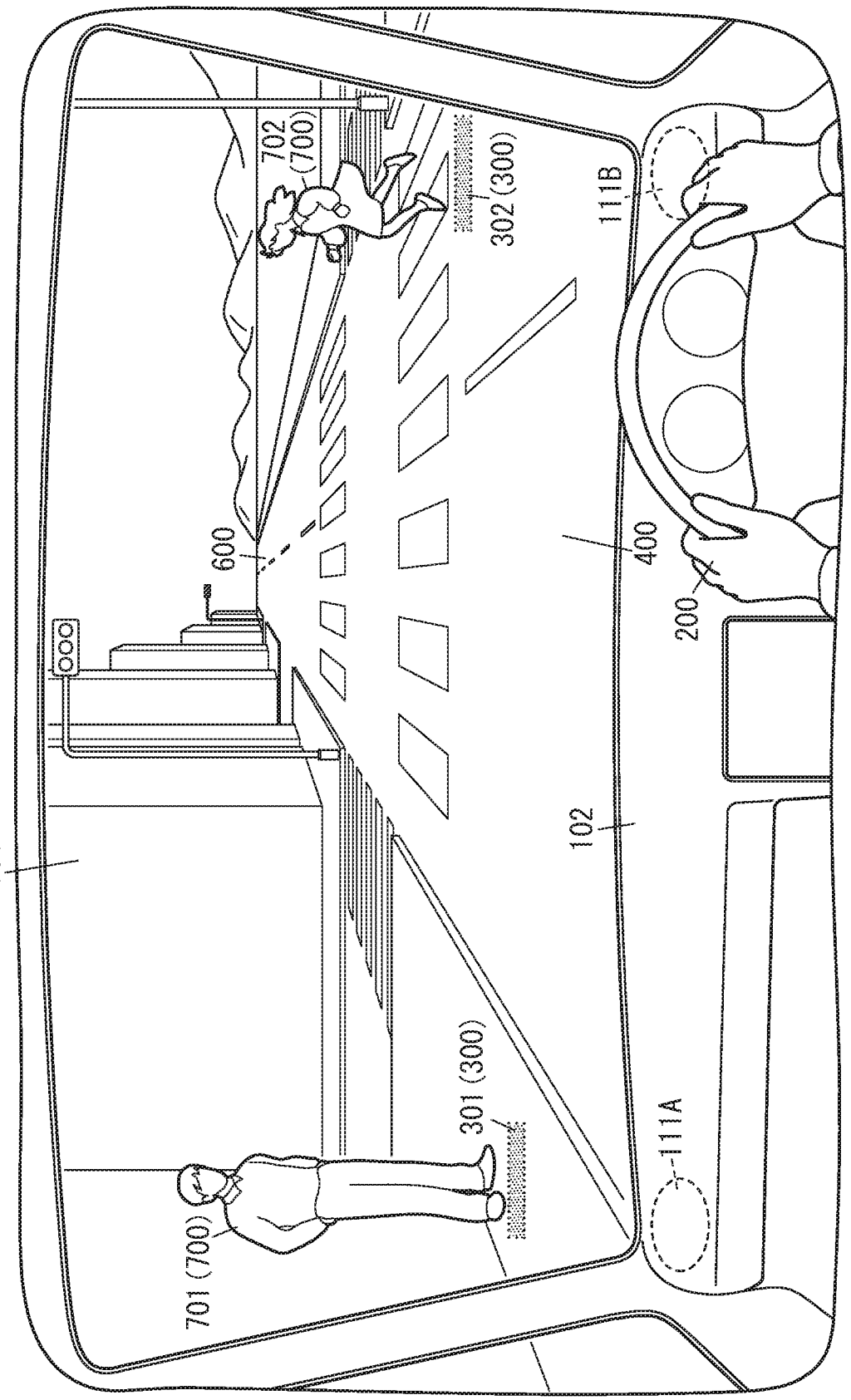
FIG. 3 is an exemplary image to be displayed on the information presentation system.
Figure 6:
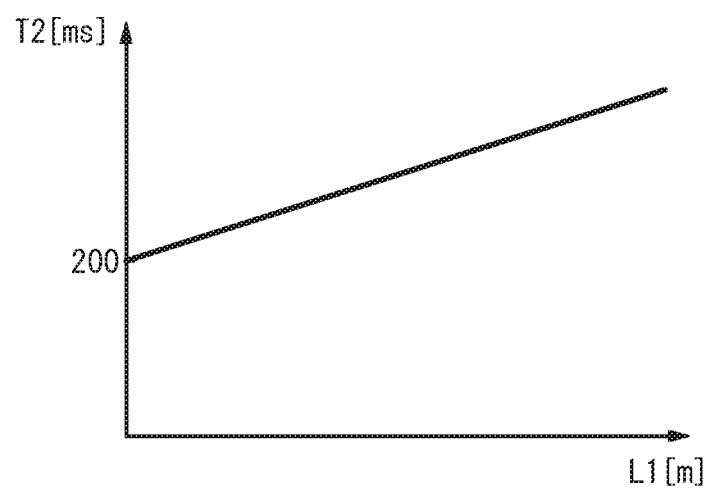
FIG. 6 is a graph showing how an information presentation system according to a variation of the first embodiment operates.

FIG. 6 is a graph showing how the time delay (constant amount of time) T2 of the second sound S12 with respect to the first sound S11 changes with the distance L1 between two objects to be detected 701, 702 (see FIG. 3). In FIG. 6, the abscissa indicates the distance L1 and the ordinate indicates the constant amount of time (time delay) T2. As can be seen from FIG. 6, the time delay T2 is proportional to the distance L1 (i.e., the longer the distance L1 is, the longer the time delay T2 becomes). In the example illustrated in FIG. 6, when the distance L1 is 0 meters [m], the time delay T2 is 200 ms.

As can be seen, changing the time delay T2 according to the distance L1 between the objects to be detected 701, 702 allows the user 200 to sense, by the length of the time delay T2, how close or how distant the objects to be detected 701, 702 are. In addition, since the time delay T2 is also set at 200 ms or more in this variation, the user 200 is still able to distinguish the first and second sounds S11 and S12 associated with the objects to be detected 701, 702. That is to say, the information presentation system 1 according to this first variation is also able to present multiple different pieces of information (about the objects to be detected 700) to the user 200 in a distinguishable way.

(4.2) Second Variation

Suppose an upper limit is set for the number of the objects to be detected 700 (or pieces of information) that are able to be presented to the presentation unit 11 of the information presentation system 1. In that case, if the number of the objects 700 detected by the information presentation system 1 is greater than the upper limit, then the upper limit number of objects to be detected 700 with a relatively high degree of priority are suitably presented by the presentation unit 11. In other words, if the number of the multiple different pieces of information is greater than the upper limit number of pieces of information that are able to be presented by the presentation unit 11, then the upper limit number of pieces of information with a relatively high degree of priority are suitably presented by the presentation unit 11. As used herein, the "degree of priority" refers to the degree of hazard that is inversely proportional to the distance from the car 10 to the object to be detected 700. That is to say, the shorter the distance is, the higher the degree of hazard, and therefore, the degree of priority, are. This configuration allows the presentation unit 11 to present the object to be detected 700 with a high degree of priority. Note that the "degree of priority" does not have to be represented by the degree of hazard inversely proportional to the distance from the car 10 to the object to be detected 700 but may also be the order of arrival, for example.

Also, in this case, those objects to be detected 700, of which the number is greater than the upper limit, may be divided into a plurality of groups, each of which is as many as the upper limit, and those groups of objects to be detected 700 may be presented by the presentation unit 11. In that case, the object space 400 is divided into a plurality of regions and each divided region is defined as a group. This configuration allows, even when the number of the plurality of objects to be detected 700 is greater than the upper limit number of objects to be detected that can be presented by the presentation unit 11, all of those objects to be detected 700 to be presented by presentation unit 11.

(4.3) Other Variations

Next, other variations will be described one after another.

The information presentation system 1 according to the present disclosure includes a computer system. The computer system includes, as its major constituent elements, hardware components such as a processor and a memory. The processor's executing a program stored in the memory of the computer system allows the function of the information presentation system 1 according to the present disclosure to be performed. The program may be stored in advance in the memory of the computer system, downloaded via a telecommunications line such as the Internet, or distributed after having been stored in a non-transitory computer-readable storage medium such as a memory card, an optical disc or a hard disk drive. The processor of the computer system is configured as a single or plurality of electronic circuits including a semiconductor integrated circuit (IC) or a largescale integrated circuit (LSI). The plurality of electronic circuits may be either integrated together on a single chip or distributed on multiple chips, whichever is appropriate. Those chips may be assembled together in a single device or distributed in multiple devices, without limitation.

Also, the plurality of functions of the information presentation system 1 does not have to be aggregated together in a single housing. Rather, the respective components of the information presentation system 1 may be distributed in multiple housings. Optionally, at least some of the functions of the information presentation system 1 may be performed by a server and cloud computing system, for example.

In the first exemplary embodiment described above, the presentation unit 11 including the audio output unit 111 and the display unit 112 forms an integral part of the information presentation system 1. However, this is only an example and should not be construed as limiting. Alternatively, the presentation unit 11 does not have to form an integral part of the information presentation system 1. For example, the audio output unit 111 of the presentation unit 11 may be a loudspeaker installed in the moving vehicle (i.e., the car in this example) 10 and the display unit 112 may be the monitor of a car navigation system installed in the moving vehicle 10. That is to say, the presentation unit 11 is not an essential constituent element of the information presentation system 1.

In the first exemplary embodiment described above, the certain period of time (time delay) T2 is supposed to have a preset fixed value. However, this is only an example and should not be construed as limiting. This fixed value may vary with the number of the objects to be detected 700 (or pieces of information), for example. The fixed value may be increased or decreased as the number of the objects to be detected 700 increases. This configuration allows the user 200 to learn, by the length of the time delay T2, how many objects to be detected 700 there are around him or her.

In the first embodiment described above, the number of the objects to be detected 700 (or pieces of information) is supposed to be two. However, this is only an example and should not be construed as limiting. Alternatively, the number of the objects to be detected 700 does not have to be two but may also be three or more. Even in such an alternative embodiment, setting the time delay (certain period of time) T2 among three or more sounds allows the information presentation system 1 to present multiple different pieces of information to the user 200 in a distinguishable way.

In the first embodiment described above, a plurality of images the virtual images 301, 302) are displayed on the single display unit 112. However, this is only an example and should not be construed as limiting. Alternatively, those images may also be separately displayed on a plurality of display units. Optionally, in that case, one of those display units may be configured as a seatbelt warning light.

Also, in the first embodiment described above, the virtual images 301, 302 are made to blink and the first sound S11 and the second sound S12 (alarm sounds) are output discontinuously in order to notify the user 200 that the objects to be detected 701, 702 are approaching the user 200. However, this is only an example and should not be construed as limiting. Alternatively, instead of being made to blink, the virtual images 301, 302 may have their color depth or their size changed or may also be shaken. The first sound S11 and the second sound S12 may also have their volume (loudness) or their acoustic frequency changed, not just being output discontinuously. Furthermore, these options may be picked up in any combination.

Furthermore, in the first embodiment described above, the control unit 13 directly controls the presentation unit 11 (including the audio output unit 111 and the display unit 112). Alternatively, an additional unit performing the function of video or audio processing, for example, may be further provided between the control unit 13 and the presentation unit 11. The additional unit such as a video processing unit or audio processing unit is implementable as a digital signal processor (DSP), for example.

Furthermore, in the first embodiment described above, the information presentation system 1 is implemented as a head-up display. However, this is only an example and should not be construed as limiting. Alternatively, the information presentation system 1 may also be implemented as a thin-film transistor liquid crystal display (TFT-LCD), for example.

Furthermore, in the first embodiment described above, the information presented by the information presentation system 1 is information about the objects to be detected 700 that are present in front of the car 10. However, this is only an example and should not be construed as limiting. Alternatively, the information presented by the information presentation system 1 may also be information about objects to be detected 700 that are present behind the car 10. In other words, the information presentation system 1 may also be implemented as a rear view monitor or an around view monitor, for example.

Second Embodiment

An information presentation system 1 according to a second exemplary embodiment outputs the first sound S11 and the second sound S12 at mutually different frequencies f1, f2, which is a major difference from the information presentation system 1 according to the first embodiment. In other words, in having information about the objects to be detected 701, 702 (as multiple different pieces of information) presented by the presentation unit 11, the information presentation system 1 presents, as sounds in the second form, the first sound S11 and the second sound S12, associated one to one with the objects to be detected 701, 702, at mutually different frequencies f1, f2. The information presentation system 1 of this second embodiment has the same configuration as the counterpart of the first embodiment. Thus, in the following description, any constituent member of this second embodiment having the same function as a counterpart of the first embodiment described above will be designated by the same reference numeral as that counterpart's, and a detailed description thereof will be omitted herein.

Figure 7:
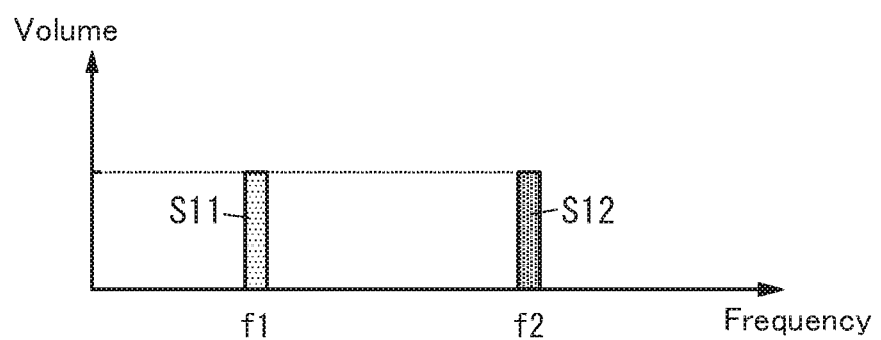
FIG. 7 is a graph showing how an information presentation system according to a second embodiment operates.

FIG. 7 is a graph showing a relationship between the frequency f1 of the first sound S11 and the frequency f2 of the second sound S12. In FIG. 7, the abscissa indicates the frequency and the ordinate indicates the volume. The first and second sounds S11 and S12 have the same volume according to this embodiment, but may also have different volumes. The first sound S11 is associated with the object to be detected 701, out of the plurality of objects to be detected 701, 702. The second sound S12 is associated with the object to be detected 702, out of the plurality of objects to be detected 701, 702.

Speaking of sensitivity to a difference in frequency, the auditory ability of humans enables a human to distinguish two sounds from each other if there is a difference of at least 5 cents between the two sounds, for example. As used herein, the "cent" is a logarithmic unit for measuring the interval between two sounds. The cent value may be calculated by the following Equation (1):

$$n = 1200 \times \log_2 \frac{f2}{f1} \tag{1}$$

That is to say, setting the respective frequencies f1 and f2 of the first and second sounds S11 and S12 such that the cent value calculated by Equation (1) becomes equal to or greater than five allows the user 200 to distinguish the first and second sounds S11 and S12 from each other. In other words, this allows the information presentation system 1 according to this embodiment to present multiple different pieces of information (about the objects to be detected 701, 702) to the user 200 in a distinguishable way.

In this case, if the object to be detected 702 is located closer to the car 10 than the object to be detected 701 is, for example, the frequency of the second sound S12 is suitably increased to notify the user 200 that the chances of the object to be detected 702 colliding against the car 10 are higher than the chances of the object to be detected 701 doing that.

Figure 8A:
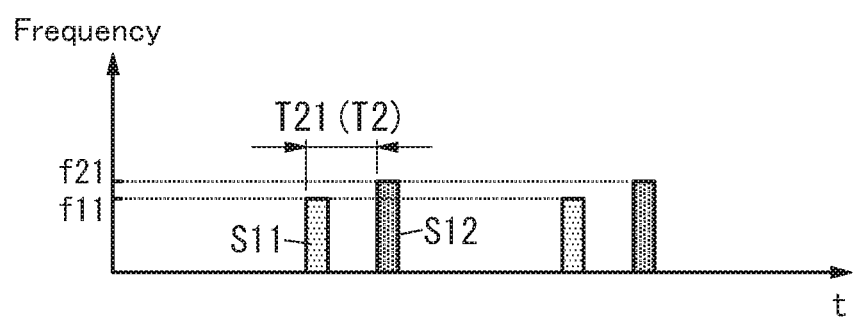
FIGS. 8A and 8B are timing diagrams illustrating how the information presentation system operates.
Figure 8B:
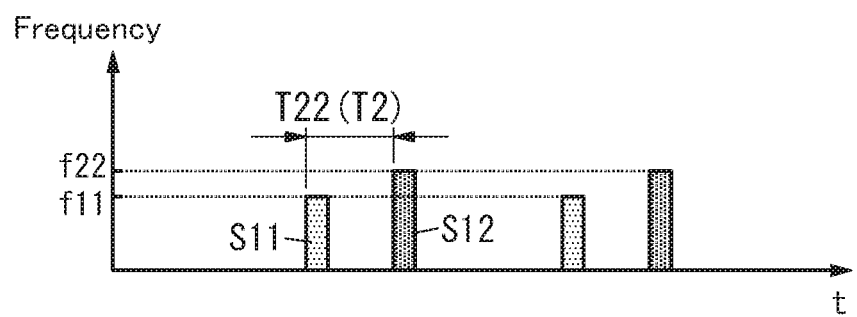

The information presentation system 1 according to this embodiment is supposed to shift the timing to output the second sound S12 by the certain period of time T2 with respect to the timing to output the first sound S11. Optionally, the cent value n may be varied according to the length of the certain period of time T2. FIG. 8A shows a relationship between the respective frequencies f1 and f2 of the first and second sounds S11 and S12 in a situation where the certain period of time (i.e., the time delay) T2 is relatively short. FIG. 8B shows a relationship between the respective frequencies f1 and f2 of the first and second sounds S11 and S12 in a situation where the certain period of time (i.e., the time delay) T2 is relatively long. In FIGS. 8A and 8B, the abscissa indicates the time and the ordinate indicates the frequency.

The frequency f1 of the first sound S11 is constant (i.e., f1=f11) irrespective of the length of the certain period of time T2 as shown in FIGS. 8A and 8B. On the other hand, the frequency f2 of the second sound S12 is varied according to the length of the certain period of time T2 as shown in FIGS. 8A and 8B. Specifically, the longer the certain period of time T2 is (T22>T21), the higher the frequency f2 is set to be (f22>f21). Thus, the cent value n varies according to the length of the certain period of time T2. Note that the magnitude of the variation in the cent value n may be a preset value or a value proportional to the length of the certain period of time T2, whichever is appropriate.

In the second embodiment described above, the frequency f1 of the first sound S11 is constant and the frequency f12 of the second sound S12 is varied. However, this is only an example and should not be construed as limiting. Alternatively, as long as the cent value is variable, the frequency f12 of the second sound S12 may be constant and the frequency f11 of the first sound S11 may be varied.

Furthermore, in the second embodiment described above, the cent value n is increased as the certain period of time T2 becomes longer. However, this is only an example and should not be construed as limiting. Alternatively, the cent value n may be decreased as the certain period of time T2 becomes longer. That is to say, the cent value n only needs to be varied according to the length of the certain period of time T2.

Optionally, any of the configurations described for this second embodiment (including variations thereof) may be combined as appropriate with any of the configurations described for the first embodiment (including variations thereof).

Third Embodiment

An information presentation system 1 according to a third exemplary embodiment adjusts the angle of incidence of each of a plurality of sounds, associated one to one with multiple different pieces of information, on the target region, which is a major difference from the information presentation system 1 according to the first embodiment. In other words, the information presentation system 1 makes the audio output unit 111 adjust the angles of incidence α1, α2 such that the difference between the angles of incidence α1, α2 of the first and second sounds S11, S12, associated one to one with multiple different pieces of information, on the target region Re1 becomes equal to or greater than a predetermined angle. The information presentation system 1 of this third embodiment has the same configuration as the counterpart of the first embodiment. Thus, in the following description, any constituent member of this third embodiment having the same function as a counterpart of the first embodiment described above will be designated by the same reference numeral as that counterpart's, and a detailed description thereof will be omitted herein.

Figure 9:
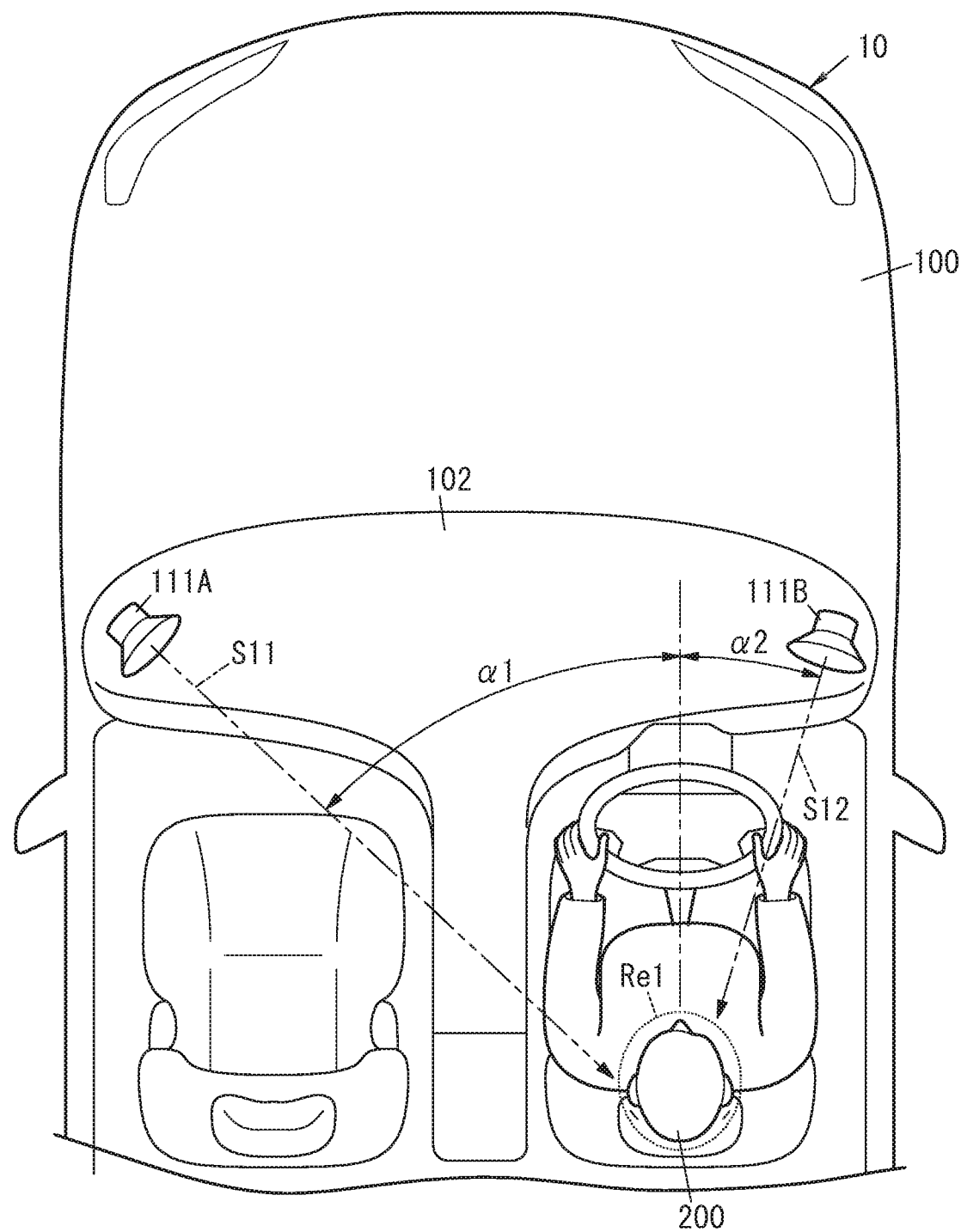
FIG. 9 is a plan view illustrating how an information presentation system according to a third embodiment may operate.

FIG. 9 is a plan view illustrating an exemplary operation of an information presentation system 1 according to this embodiment. In this embodiment, the information presentation system 1 includes two audio output units 111A, 111B, each of which may be implemented as a loudspeaker, for example. The audio output unit 111A is located on the front left side when viewed from a user 200 seated in the driver's seat, while the audio output unit 111B is located on the front right side when viewed from a user 200 seated in the driver's seat. In FIG. 9, Re1 denotes a target region on which the first and second sounds S11 and S12 output from the audio output units 111A, 111B are incident. In this embodiment, the target region Re1 is set to cover the user's 200 head.

The angle of incidence of the first sound S11, output from the audio output unit 111A, on the target region Re1 is α1, while the angle of incidence of the second sound S12, output from the audio output unit 111B, on the target region Re1 is α2. These angles of incidence α1 and α2 are different in this embodiment, but may be equal to each other. Also, in this embodiment, the first sound S11 is associated with the virtual image 301 of the object to be detected 701 located on the left, and the second sound S12 is associated with the virtual image 302 of the object to be detected 702 located on the right. That is to say, the information presentation system 1 according to this embodiment makes the left-side audio output unit 111A output the first sound S11 in association with the left-side virtual image 301, and also makes the right-side audio output unit 111B output the second sound S12 in association with the right-side virtual image 302. Optionally, the positional relationship between the virtual images 301, 302 and the audio output units 111A, 111B may be horizontally inverted.

Speaking of sensitivity to a difference in the angle of incidence between two sounds coming from a frontal direction for a person, the auditory ability of humans enables him or her to distinguish the two sounds from each other, as long as there is an angular difference of at least 1 degree (corresponding to a time lag of 10 μs) between the two sounds. In other words, the person is able to distinguish a plurality of sounds from each other as long as the difference in the angle of incidence on the target region between the plurality of sounds is equal to or greater than a predetermined angle.

In the example illustrated in FIG. 9, as long as the difference between the angle of incidence α1 of the first sound S11 on the target region Re1 and the angle of incidence α2 of the second sound S12 on the target region Re1 is at least equal to one degree, the user 200 is able to distinguish the first and second sounds S11 and S12 from each other.

As can be seen, as long as the difference between the angle of incidence α1 of the first sound S11 on the target region Re1 and the angle of incidence α2 of the second sound S12 on the target region Re1 is equal to or greater than a predetermined angle, the user 200 is able to distinguish the first and second sounds S11 and S12 from each other. This allows the user 200 to distinguish multiple different pieces of information from each other even when the multiple different pieces of information (about the objects to be detected 700) are presented by the presentation unit 11.

In the third embodiment described above, one audio output unit 111A outputs the first sound S11 and the other audio output unit 111B outputs the second sound S12 as an example. However, this is only an example and should not be construed as limiting. Alternatively, a single audio output unit may be configured to output both of the first and second sounds S11 and S12 by changing its own orientation. In that case, the orientation of the audio output unit may be adjusted such that the sum of the respective angles of incidence of the first and second sounds S11 and S12 becomes equal to or greater than one degree.

Optionally, the audio output unit may be implemented as a directivity loudspeaker, which has a structure in which a plurality of ultrasonic transducers are arranged in a linear pattern. The directivity loudspeaker has a fixed position mode and a variable mode. In the fixed position mode, radiating a plurality of modulated waves, each obtained by modulating an ultrasonic carrier wave with an audible sound (audio signal), from the respective ultrasonic transducers at the same time allows the modulated waves to be radiated perpendicularly to the direction in which the ultrasonic transducers are arranged. In the variable mode, radiating a plurality of modulated waves, each obtained by modulating an ultrasonic carrier wave with an audible sound (audio signal), from the respective ultrasonic transducers at multiple different times allows the modulated waves to be radiated obliquely to a normal to the direction in which the ultrasonic transducers are arranged. As can be seen, making up the audio output unit of directivity loudspeakers allows the sound propagation direction to be changed. Thus, this allows a single audio output unit to output a plurality of sounds, of which the angles of incidence on the target region are set to at values equal to or greater than a predetermined angle. That is to say, even in such a situation, the user 200 is also able to distinguish a plurality of sounds from each other and also distinguish multiple different pieces of information, associated one to one with the plurality of sounds, from each other.

Furthermore, acoustic images may be oriented at the locations of the respective objects to be detected 701, 702 so that the user 200 is able to distinguish the directions, from which the first and second sounds S11 and S12 are coming, from each other.

Any of the configurations described for this third embodiment (including variations thereof) may be combined as appropriate with any of the configurations described for the first and second embodiments (including variations thereof).

(Resume)

As can be seen from the foregoing description, an information presentation system (1) according to a first aspect makes a presentation unit (11), having the ability to present multiple different pieces of information, change, with passage of time, a first form of presentation of an image displayed and a second form of presentation of a sound output with respect to each of the multiple different pieces of information. The information presentation system (1) makes the presentation unit (11) present each of the multiple different pieces of information such that the image (virtual image (301, 302)) displayed in the first form and the sound (S10) output in the second form are synchronized with each other on an individual basis. The information presentation system (1) makes the presentation unit (11) shift, when presenting two different pieces of information, selected from the multiple different pieces of information, as two sounds (S10) in the second form, a timing to output one of the two sounds (S10) by at least a certain period of time with respect to a timing to output the other of the two sounds (S10), in order to prevent the two sounds (S10) from overlapping with each other.

According to this aspect, two sounds (S10), associated one to one with the multiple different pieces of information, are output at mutually different timings, thus allowing multiple different pieces of information to be presented in a distinguishable way.

In an information presentation system (1) according to a second aspect, which may be implemented in conjunction with the first aspect, the presentation unit (11) includes a single display unit (112). The information presentation system (1) makes the presentation unit (11) display, in the first form, multiple images (virtual images (301, 302)), associated one to one with the multiple different pieces of information, on the display unit (112).

This aspect allows multiple images (virtual images (301, 302)), associated one to one with the multiple different pieces of information, to be displayed on the display unit (112).

An information presentation system (1) according to a third aspect, which may be implemented in conjunction with the first or second aspect, makes the presentation unit (11) output, when presenting the multiple different pieces of information in the second form, multiple sounds (S10), associated one to one with the multiple different pieces of information, at mutually different frequencies (f1, f2).

According to this aspect, multiple sounds (S10), associated one to one with the multiple different pieces of information, are output at mutually different frequencies (f1, f2), thus allowing multiple different pieces of information to be presented in a distinguishable way.

In an information presentation system (1) according to a fourth aspect, which may be implemented in conjunction with of any one of the first to third aspects, the presentation unit (11) includes an audio output unit (111). The information presentation system (1) makes the audio output unit (111) adjust, when the presentation unit (11) presents the multiple different pieces of information, angles of incidence ($\alpha 1, \alpha 2$) at which sounds (S10), associated one to one with the multiple different pieces of information, are incident on their respective target regions (Re1) such that a difference between the angles of incidence ($\alpha 1, \alpha 2$) of the sounds (S10) on the target regions (Re1) becomes equal to or greater than a certain angle.

According to this aspect, a difference between the angles of incidence ($\alpha 1, \alpha 2$) of the sounds (S10) on the target regions (Re1) is equal to or greater than a certain angle, thus allowing multiple different pieces of information to be presented in a distinguishable way.

An information presentation system (1) according to a fifth aspect, which may be implemented in conjunction with of any one of the first to fourth aspects, makes the presentation unit (11) present, when finding the number of the multiple different pieces of information greater than an upper limit of the number of pieces of information to be presented by the presentation unit itself (11), some pieces of information, which are selected from the multiple different pieces of information and given a relatively high degree of priority and of which the number is equal to the upper limit.

This aspect allows, even when the number of the pieces of information to be presented by the presentation unit (11) is greater than the upper limit of the pieces of information that can be presented there, the presentation unit (11) to present pieces of information with a relatively high degree of priority.

In an information presentation system (1) according to a sixth aspect, which may be implemented in conjunction with the fifth aspect, the multiple different pieces of information are associated one to one with a plurality of objects to be detected (700) which are present in an object space (400). Each of the multiple different pieces of information is given a degree of priority that increases as a distance to an associated one of the plurality of objects to be detected (700) decreases.

This aspect makes, considering that the degree of hazard increases as the distance to the object to be detected (700) decreases, the presentation unit (11) preferentially present a piece of information with a relatively high degree of hazard.

An information presentation system (1) according to a seventh aspect, which may be implemented in conjunction with any one of the first to fourth aspects, makes the presentation unit (11) divide, when finding the number of the multiple different pieces of information greater than an upper limit of the number of pieces of information to be presented by the presentation unit itself (11), the multiple different pieces of information into a number, which is equal to the upper limit, of groups of information, and present the groups of information.

This aspect allows, even when the number of the multiple different pieces of information to be presented by the presentation unit (11) is greater than an upper limit of the number of pieces of information that can be presented there, every piece of information to be presented by the presentation unit (11).

In an information presentation system (1) according to an eighth aspect, which may be implemented in conjunction with of any one of the first to seventh aspects, the certain period of time (T2) is a fixed value.

This aspect eliminates the need of changing the certain period of time (T2).

In an information presentation system (1) according to a ninth aspect, which may be implemented in conjunction with of any one of the first to seventh aspects, the multiple different pieces of information are associated one to one with a plurality of objects to be detected (700) which are present in an object space (400). The certain period of time (T2) varies according to a distance (L1) between the plurality of objects to be detected (700).

This aspect allows the distances to the plurality of objects to be detected (700) to be determined by the length of the certain period of time (T2) in order to notify the user (200) how distant the plurality of objects to be detected (700) are located from the user (200).

In an information presentation system (1) according to a tenth aspect, which may be implemented in conjunction with of any one of the first to seventh aspects, the multiple different pieces of information are associated one to one with a plurality of objects to be detected (700) which are present in an object space (400). The certain period of time (T2) increases as the number of the plurality of objects to be detected (700) increases.

This aspect allows the number of the plurality of objects to be detected (700) to be determined by the length of the certain period of time (T2) in order to notify the user (200) how many objects to be detected (700) there are around the user (200).

A moving vehicle (10) according to an eleventh aspect includes: the information presentation system (1) according to any one of the first to tenth aspects; and a moving vehicle body (100) equipped with the presentation unit (11).

This aspect allows the moving vehicle (10) to present multiple different pieces of information in a distinguishable way.

An information presentation method according to a twelfth aspect of the present disclosure includes making a presentation unit (11) with the ability to present multiple different pieces of information change, with passage of time, a first form of presentation of an image displayed and a second form of presentation of a sound output with respect to each of the multiple different pieces of information. The information presentation method includes: making the presentation unit (11) present each of the multiple different pieces of information such that the image (virtual image (301, 302)) in the first form and the sound (S10) in the second form are synchronized with each other on an individual basis. The information presentation method further includes shifting, when having two different pieces of information, selected from the multiple different pieces of information, presented by the presentation unit (11) as two sounds (S10) in the second form, a timing to output one of the two sounds (S10) by at least a certain period of time (T2) with respect to a timing to output the other of the two sounds (S10), in order to prevent the two sounds (S10) from overlapping with each other.

According to this aspect, two sounds (S10), associated one to one with the multiple different pieces of information, are output at mutually different timings, thus allowing multiple different pieces of information to be presented in a distinguishable way.

A non-transitory storage medium according to a thirteenth aspect stores a program that is designed to make a computer system perform processing of making a presentation unit (11) with the ability to present multiple different pieces of information change, with passage of time, a first form of presentation of an image displayed and a second form of presentation of a sound output with respect to each of the multiple different pieces of information. The processing includes: making the presentation unit (11) present each of the multiple different pieces of information such that the image (virtual image (301, 302)) in the first form and the sound (S10) in the second form are synchronized with each other on an individual basis; and shifting, when having two different pieces of information, selected from the multiple different pieces of information, presented by the presentation unit (11) as two sounds (S10) in the second form, a timing to output one of the two sounds (S10) by at least a certain period of time (T2) with respect to a timing to output the other of the two sounds (S10), in order to prevent the two sounds (S10) from overlapping with each other.

According to this aspect, two sounds (S10), associated one to one with the multiple different pieces of information, are output at mutually different timings, thus allowing multiple different pieces of information to be presented in a distinguishable way.

Note that the configurations according to the second to tenth aspects are not essential constituent elements of the information presentation system (1) but may be omitted as appropriate.

While the foregoing has described what are considered to be the best mode and/or other examples, it is understood that various modifications may be made therein and that the subject matter disclosed herein may be implemented in various forms and examples, and that they may be applied in numerous applications, only some of which have been described herein. It is intended by the following claims to claim any and all modifications and variations that fall within the true scope of the present teachings.

The entire contents of International Patent Application No. PCT/JP2018/040718 and Japanese Patent Application No. 2017-215121 mentioned above are incorporated by reference for all purposes.

The invention claimed is:

1. An information presentation system configured to make a presentation circuit, having an ability to present multiple different pieces of information that are associated one to one with a plurality of objects to be detected which are present in an object space, change a first form of presentation of an image displayed and a second form of presentation of a sound output with respect to each of the multiple different pieces of information in accordance with distances to the plurality of objects to be detected, the information presentation system making the presentation circuit present each of the multiple different pieces of information such that the image presented in the first form and the sound presented in the second form are synchronized with each other on an individual basis, the information presentation system making the presentation circuit shift, when presenting two different pieces of information, selected from the multiple different pieces of information, as two sounds in the second form, a timing to output one of the two sounds by at least a certain period of time with respect to a timing to output the other of the two sounds, in order to prevent the two sounds from overlapping with each other.

2. The information presentation system of claim 1, wherein the presentation circuit includes a single display, and the information presentation system makes the presentation circuit display, in the first form, multiple images, associated one to one with the multiple different pieces of information, on the display.

3. The information presentation system of claim 2, wherein the information presentation system makes the presentation circuit output, when presenting the multiple different pieces of information in the second form, multiple sounds, associated one to one with the multiple different pieces of information, at mutually different frequencies.

4. The information presentation system of claim 2, wherein the presentation circuit includes an audio output circuit, and the information presentation system makes the audio output circuit adjust, when the presentation circuit presents the multiple different pieces of information as sounds, angles of incidence at which the sounds, associated one to one with the multiple different pieces of information, are incident on their respective target regions such that a difference between the angles of incidence of the sounds on the target regions becomes equal to or greater than a certain angle.

5. The information presentation system of claim 2, wherein the information presentation system makes the presentation circuit present, when finding a number of the multiple different pieces of information greater than an upper limit of a number of pieces of information to be presented by the presentation circuit itself, some pieces of information, which are selected from the multiple different pieces of information and given a relatively high degree of priority and of which a number is equal to the upper limit.

6. The information presentation system of claim 2, wherein the information presentation system makes the presentation circuit divide, when finding a number of the multiple different pieces of information greater than an upper limit of a number of pieces of information to be presented by the presentation circuit itself, the multiple different pieces of information into a number, which is equal to the upper limit, of groups of information, and present the groups of information.

7. The information presentation system of claim 1, wherein the information presentation system makes the presentation circuit output, when presenting the multiple different pieces of information in the second form, multiple sounds, associated one to one with the multiple different pieces of information, at mutually different frequencies.

8. The information presentation system of claim 7, wherein the presentation circuit includes an audio output circuit, and the information presentation system makes the audio output circuit adjust, when the presentation circuit presents the multiple different pieces of information as sounds, angles of incidence at which the sounds, associated one to one with the multiple different pieces of information, are incident on their respective target regions such that a difference between the angles of incidence of the sounds on the target regions becomes equal to or greater than a certain angle.

9. The information presentation system of claim 7, wherein the information presentation system makes the presentation circuit present, when finding a number of the multiple different pieces of information greater than an upper limit of a number of pieces of information to be presented by the presentation circuit itself, some pieces of information, which are selected from the multiple different pieces of information and given a relatively high degree of priority and of which a number is equal to the upper limit.

10. The information presentation system of claim 1, wherein the presentation circuit includes an audio output circuit, and the information presentation system makes the audio output circuit adjust, when the presentation circuit presents the multiple different pieces of information as sounds, angles of incidence at which the sounds, associated one to one with the multiple different pieces of information, are incident on their respective target regions such that a difference between the angles of incidence of the sounds on the target regions becomes equal to or greater than a certain angle.

11. The information presentation system of claim 10, wherein the information presentation system makes the presentation circuit present, when finding a number of the multiple different pieces of information greater than an upper limit of a number of pieces of information to be presented by the presentation circuit itself, some pieces of information, which are selected from the multiple different pieces of information and given a relatively high degree of priority and of which a number is equal to the upper limit.

12. The information presentation system of claim 1, wherein the information presentation system makes the presentation circuit present, when finding a number of the multiple different pieces of information greater than an upper limit of a number of pieces of information to be presented by the presentation circuit itself, some pieces of information, which are selected from the multiple different pieces of information and given a relatively high degree of priority and of which a number is equal to the upper limit.

13. The information presentation system of claim 12, wherein each of the multiple different pieces of information is given a degree of priority that increases as a distance to an associated one of the plurality of objects to be detected decreases.

14. The information presentation system of claim 1, wherein
the information presentation system makes the presentation circuit divide, when finding a number of the multiple different pieces of information greater than an upper limit of a number of pieces of information to be presented by the presentation circuit itself, the multiple different pieces of information into a number, which is equal to the upper limit, of groups of information, and present the groups of information.

15. The information presentation system of claim 1, wherein
the certain period of time is a fixed value.

16. The information presentation system of claim 1, wherein
the certain period of time varies according to a distance between the plurality of objects to be detected.

17. The information presentation system of claim 1, wherein
the certain period of time increases as a number of the plurality of objects to be detected increases.

18. A moving vehicle comprising:
the information presentation system of claim 1; and
a moving vehicle body equipped with the presentation circuit.

19. An information presentation method comprising making a presentation circuit, having an ability to present multiple different pieces of information that are associated one to one with a plurality of objects to be detected which are present in an object space, change a first form of presentation of an image displayed and a second form of presentation of a sound output with respect to each of the multiple different pieces of information in accordance with distances to the plurality of objects to be detected,
the method including:
making the presentation circuit present each of the multiple different pieces of information such that the image displayed in the first form and the sound output in the second form are synchronized with each other on an individual basis; and
shifting, when presenting two different pieces of information, selected from the multiple different pieces of information, as two sounds in the second form, a timing to output one of the two sounds by at least a certain period of time with respect to a timing to output the other of the two sounds, in order to prevent the two sounds from overlapping with each other.

20. A non-transitory storage medium storing a program that is designed to make a computer system perform processing of making a presentation circuit, having an ability to present multiple different pieces of information that are associated one to one with a plurality of objects to be detected which are present in an object space, change a first form of presentation of an image displayed and a second form of presentation of a sound output with respect to each of the multiple different pieces of information in accordance with distances to the plurality of objects to be detected,
the processing including:
making the presentation circuit present each of the multiple different pieces of information such that the image displayed in the first form and the sound output in the second form are synchronized with each other on an individual basis; and
shifting, when presenting two different pieces of information, selected from the multiple different pieces of information, as two sounds in the second form, a timing to output one of the two sounds by at least a certain period of time with respect to a timing to output the other of the two sounds, in order to prevent the two sounds from overlapping with each other.

\* \* \* \* \*